United States Patent
Srinivas et al.

(10) Patent No.: US 9,490,880 B1
(45) Date of Patent: Nov. 8, 2016

(54) HARDWARE-BASED TIME ALIGNMENT OF WIRELESS LINKS

(71) Applicant: FREESCALE SEMICONDUCTOR, INC., Austin, TX (US)

(72) Inventors: Raghavendra Srinivas, Bangalore (IN); Apoorv Goel, Ghaziabad (IN); Arvind Kaushik, Ghaziabad (IN); Sachin Prakash, Noida (IN)

(73) Assignee: FREECSALE SEMICONDUCTOR, INC., Austin, TX (US)

( * ) Notice: Subject to any disclaimer, the term of this patent is extended or adjusted under 35 U.S.C. 154(b) by 0 days.

(21) Appl. No.: 14/989,805

(22) Filed: Jan. 7, 2016

(51) Int. Cl.
  *H04B 7/04* (2006.01)
  *H04B 1/3816* (2015.01)
  *H04L 7/00* (2006.01)

(52) U.S. Cl.
  CPC .......... *H04B 7/0413* (2013.01); *H04B 1/3816* (2013.01); *H04L 7/0008* (2013.01)

(58) Field of Classification Search
  CPC .. H04B 7/0413; H04B 1/3816; H04L 7/0008
  See application file for complete search history.

(56) References Cited

U.S. PATENT DOCUMENTS

| | | | |
|---|---|---|---|
| 7,948,964 B1 | 5/2011 | Khlat et al. | |
| 8,176,340 B2 | 5/2012 | Tripathi et al. | |
| 8,254,365 B2 | 8/2012 | Storm et al. | |
| 8,379,627 B2 | 2/2013 | Beamish et al. | |
| 8,520,787 B2 | 8/2013 | Hennedy | |
| 8,705,581 B1 | 4/2014 | Haas | |
| 8,964,791 B2 | 2/2015 | Vu et al. | |
| 8,994,425 B2 | 3/2015 | Venkata et al. | |
| 9,026,834 B2 | 5/2015 | Reinhardt | |
| 2012/0230455 A1* | 9/2012 | Hennedy | H04L 25/14 375/354 |
| 2013/0249719 A1* | 9/2013 | Ryan | G06F 5/06 341/118 |
| 2014/0003564 A1* | 1/2014 | Kammaje | G06F 5/06 375/354 |
| 2014/0023048 A1* | 1/2014 | Vu | H04B 7/26 370/336 |
| 2014/0105101 A1* | 4/2014 | Vu | H04L 1/0008 370/328 |
| 2015/0016272 A1* | 1/2015 | Keyes, Jr. | H04L 43/18 370/241 |

* cited by examiner

*Primary Examiner* — Kenneth Lam
(74) *Attorney, Agent, or Firm* — Charles E. Bergere

(57) ABSTRACT

For a baseband digital front-end (BDFE) processor that communicates with one or more radio-frequency integrated circuit (RFIC) chips over two or more JESD-compliant links in a multi-antenna base station, the BDFE has JESD transmitters (TXs) and receivers (RXs) that transmit and receive data to and from the RFIC chips and a time-based generator (TBGEN) that generates sync and idle signals that ensure that the processing of the different JESD TXs and RXs are aligned in time for data associated with a single logical group of antennas. The TBGEN has hardware-based alignment circuitry that generates the sync and idle signals, thereby avoiding the latency and unpredictability inherent with software-based solutions.

6 Claims, 9 Drawing Sheets

HARDWARE-BASED TIME ALIGNMENT OF WIRELESS LINKS

BACKGROUND

The present invention relates to baseband systems and, more particularly, to the mutual time alignment of multiple wireless links in a MIMO (multiple in, multiple out) base station.

In a conventional MIMO cellular communications network, a base station has a number of antennas and electronic equipment to support the operations of those antennas, where each antenna can receive incoming (i.e., uplink) signals from wireless UE (user equipment) devices and transmit outgoing (i.e., downlink) signals to the UEs.

In certain conventional base stations, the electronic equipment includes (a) a baseband digital front-end (BDFE) processor that performs baseband signal processing on digital versions of the incoming and outgoing signals, (b) one or more radio frequency integrated circuit (RFIC) transceiver chips comprising (i) digital-to-analog converters (DACs) that convert outgoing digital signals into outgoing analog signals and (ii) analog-to-digital converters (ADCs) that convert incoming analog signals into incoming digital signals, and (c) power amplifiers, one for each antenna, that amplify the outgoing analog signals to be transmitted by the antennas.

In certain conventional implementations, each RFIC chip can be configured to support a maximum number of different antennas, where the BDFE processor and each RFIC chip communicate with each other over bi-directional, duplexed, JESD communication links that conform to the Joint Electron Device Engineering Council (JEDEC) Serial Interface for Data Converters standard (Document JESD204B.01, January 2012), the teachings of which are incorporated herein by reference, where there is one JESD link for each antenna. Thus, for an RFIC chip that supports up to four different antennas, there will be four JESD links between that RFIC chip and the BDFE processor.

To support communications over the JESD links, the BDFE processor has a JESD-compliant interface comprising a JESD transmitter (TX) and a JESD receiver (RX) for each JESD link with an RFIC chip, and each RFIC chip also has a JESD-compliant interface comprising a JESD TX and a JESD RX for each JESD link with the BDFE processor. Each JESD RX (in either the BDFE processor or in an RFIC chip) is able to detect an out-of-sync condition in the data that the JESD RX receives over the corresponding JESD link. Thus, a JESD RX in the BDFE processor is able to detect an out-of-sync condition in the data that that JESD RX receives from the corresponding JESD TX in the corresponding RFIC chip over the corresponding JESD link. Similarly, the corresponding JESD RX in that same corresponding RFIC chip is able to detect an out-of-sync condition in the data that that JESD RX receives from the corresponding JESD TX in the BDFE processor over that same corresponding JESD link.

According to the JESD standard, for two nodes (e.g., a BDFE processor and an RFIC chip) communicating over a JESD link, the first node transmits a sync signal to the second node indicating whether the JESD RX in the first node has determined that the corresponding JESD link is in sync (i.e., sync signal high) or out of sync (i.e., sync signal low). Similarly, the second node transmits a sync signal to the first node indicating whether the JESD RX in the second node has determined that the same JESD link is in sync or out of sync.

If, for example, the first node receives a sync signal indicating that the JESD link is out of sync, then the first node responds by transmitting a data signal having a fixed data pattern over the JESD link to the second node to enable the second node to re-synchronize the JESD link. During that re-synchronization process, the transmission of real user data from the first node to the second node over that JESD link is interrupted. After the re-synchronization process is complete, the second node will transmit a sync signal to the first node indicating that the JESD link is back in sync, and the first node can then resume the transmission of real user data to the second node over the JESD link.

In some conventional MIMO base stations, the antennas can be configured in different ways at different times to support different communications. For example, at any given time, one or more subsets of the antennas can be configured into one or more logical groups to support communications with the UEs. In order to ensure that (i) the outgoing signals will be able to be successfully processed at the UEs and that (ii) the incoming signals will be able to be successfully processed at the base station, the different signal processing paths (also referred to herein as "lanes") associated with the different antennas in a logical group need to be mutually aligned in time.

Note that, as used in this specification, the terms "synchronization" and "in sync" refer to the timing within a single processing path, such as within a single JESD link, while the terms "time alignment" and "aligned in time" refer to the relative timing between different signal processing paths, such as between multiple JESD links. In general, two or more JESD links can be individually in sync and still not be mutually aligned in time with each other. For successful communications, the JESD links for a logical group of antennas should be both individually in sync as well as mutually aligned in time.

If one of the JESD links in a logical group becomes out of sync, then the processing of real user data is suspended, and all of the JESD links in that logical group should be individually re-synchronized and mutually re-aligned in time before the processing of real user data is resumed. Similarly, if one or more additional antennas are added to an existing logical group, then again the processing of real user data is suspended, and all of the JESD links in that augmented logical group should be individually re-synchronized and mutually re-aligned in time before the processing of real user data is resumed.

In conventional JESD-compliant MIMO base stations, the process of synchronizing and time aligning multiple JESD links is controlled by software executed by the BDFE processor using a time-based generator module. One such solution is described in U.S. Pat. No. 8,964,791, the teachings of which are incorporated herein by reference in their entirety. Unfortunately, the latency associated with this software-based solution is undesirably long. Moreover, the software-based solution involves general-purpose processor interrupts which can be unpredictable and therefore non-deterministic.

BRIEF DESCRIPTION OF THE DRAWINGS

Embodiments of the invention will become more fully apparent from the following detailed description, the appended claims, and the accompanying drawings in which like reference numerals identify similar or identical elements.

DETAILED DESCRIPTION

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

As used herein, the terms "assert" and "de-assert" are used when referring to the rendering of a control signal, status bit, or other relevant functional feature or element into its logical true state and logical false state, respectively. If the logical true state is a voltage level one (i.e., high), then the logical false state is a voltage level zero (i.e., low). Alternatively, if the logical true state is voltage level zero, then the logical false state is voltage level one. The "~" symbol in the name of a signal, like the "~" at the end of the name "SYNC~", implies that the signal is low active.

In various alternative embodiments, each logic signal described herein may be generated using positive or negative logic circuitry. For example, in the case of a negative logic signal, the signal is active low, and the logical true state corresponds to a voltage level zero. Alternatively, in the case of a positive logic signal, the signal is active high, and the logical true state corresponds to a voltage level one.

Figure 1:
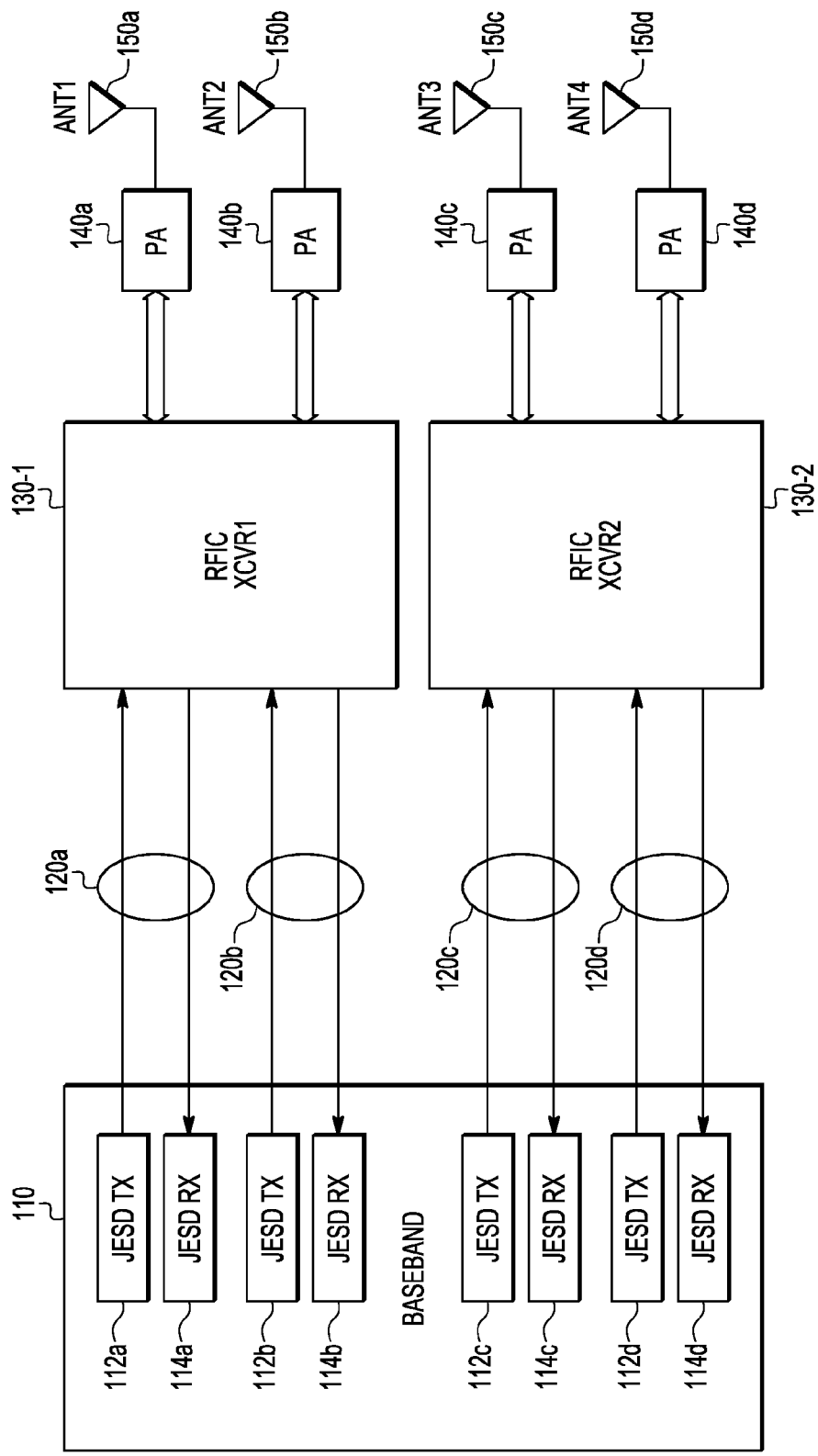
FIG. 1 is a high-level block schematic block diagram of a MIMO base station for a cellular communications network according to one embodiment of the present invention.

In one embodiment, an article of manufacture comprises a baseband digital front-end (BDFE) processor (e.g., 110 of FIGS. 1 and 2) for a multiple-in, multiple-out (MIMO) system (e.g., 100 of FIG. 1) having one or more radio-frequency integrated circuit (RFIC) chips (e.g., 130 of FIG. 1) connected to the BDFE processor by way of multiple JESD204B lanes (e.g., 120 of FIG. 1). The BDFE processor comprises (i) one or more sync-alignment circuits (e.g., 520 of FIG. 5) comprising one or more sets of hardware logic (e.g., 522, 524, 526 of FIG. 5) that generate multiple, time-aligned JESD204B SYNC~ signals (e.g., 527 of FIG. 5) for a group of the JESD204B lanes based on a sync-to-lane mapping (e.g., FIG. 3) and a lane-to-group mapping (e.g., FIG. 4) and (ii) multiple idle generation circuits (e.g., 600 of FIG. 6) comprising multiple sets of hardware logic (e.g., 610, 620, 630, 640, 650, 660 of FIG. 6) that generate multiple, time-aligned JESD204B IDLE signals (e.g., 663 of FIG. 6) for the group of the JESD204B lanes based on a group-to-idle mapping (e.g., FIG. 7).

As used in this specification, the term "hardware logic" refers to a configuration of non-programmable circuit elements that is designed to perform one or more specific functions. Such hardware logic may be driven by programmable registers, such as in the sync-alignment circuits 520 of FIG. 5 and the idle generation circuits 600 of FIG. 6 being driven by the programmable registers of FIGS. 3, 4, and 7, but the circuitry of the hardware logic itself is not programmable. ASIC (application-specific integrated circuit) circuitry is an example of hardware logic.

FIG. 1 is a high-level schematic block diagram of a simple, example MIMO base station 100 for a cellular communications network, according to one possible embodiment of the invention, where the base station 100 has a baseband digital front end (BDFE) processor 110, two RFIC transceiver chips 130-1 and 130-2, four power amplifiers (PAs) 140a-140d, two for each RFIC chip 130, and four antennas 150a-150d, one for each power amplifier 140. Alternatively, FIG. 1 could represent just a portion of a more-complex MIMO base station 100 having more RFIC chips 130, more associated power amplifiers 140, and more associated antennas 150.

In either case, in this particular embodiment, each RFIC chip 130 supports the communications of two antennas 150 and, as such, each RFIC chip 130 communicates with the BDFE processor 110 via two JESD links 120 (one for each antenna 150), where the BDFE processor 110 has a JESD TX 112 and a JESD RX 114 for each JESD link 120. In alternative embodiments, each RFIC chip 130 can support the communications of more than two antennas 150, in which case, there would be the same "more than two" number of JESD links 120 between each RFIC chip 130 and the BDFE processor 110, with a corresponding JESD TX 112 and a corresponding JESD RX 114 in the BDFE processor 110 for each JESD link 120. It is also possible to have embodiments in which each RFIC chip 130 supports the communications of only one antenna 150 with only one JESD link 120 between each RFIC chip 130 and the BDFE processor 110. It is also possible to have an embodiment with different RFIC chips 130 supporting different numbers of antennas 150 and having corresponding different numbers of JESD links 120 with the BDFE processor 110. The following discussion will be based on the particular embodiment shown in FIG. 1. Those skilled in the art will understand how to apply those teachings to other embodiments.

The base station 100 can be selectively configured to logically group all or only a subset of the antennas 150 together to support communications with the UEs (not shown) of the cellular communications network. In one possible configuration, the three antennas 150a-150c are logically grouped for such communications, where the fourth antenna 150d is not used. In that case, the three JESD links 120a-120c for the antennas 150a-150c will need to be individually synchronized and mutually aligned in time to enable successful communications between the base station 100 and the UEs (not shown). If and when any of the JESD links 120a-120c becomes out-of-sync, then the processing of real user data is suspended, and all of the JESD links 120a-120c will need to be both individually re-synchronized and mutually re-aligned in time in order to resume the processing of real user data. Similarly, if the fourth antenna 150d is subsequently added to the logical group, then the processing of real user data is suspended, and all of the JESD links 120a-120d will need to be both individually (re-)synchronized and mutually (re-)aligned in time in order to resume the processing of real user data.

Figure 2:
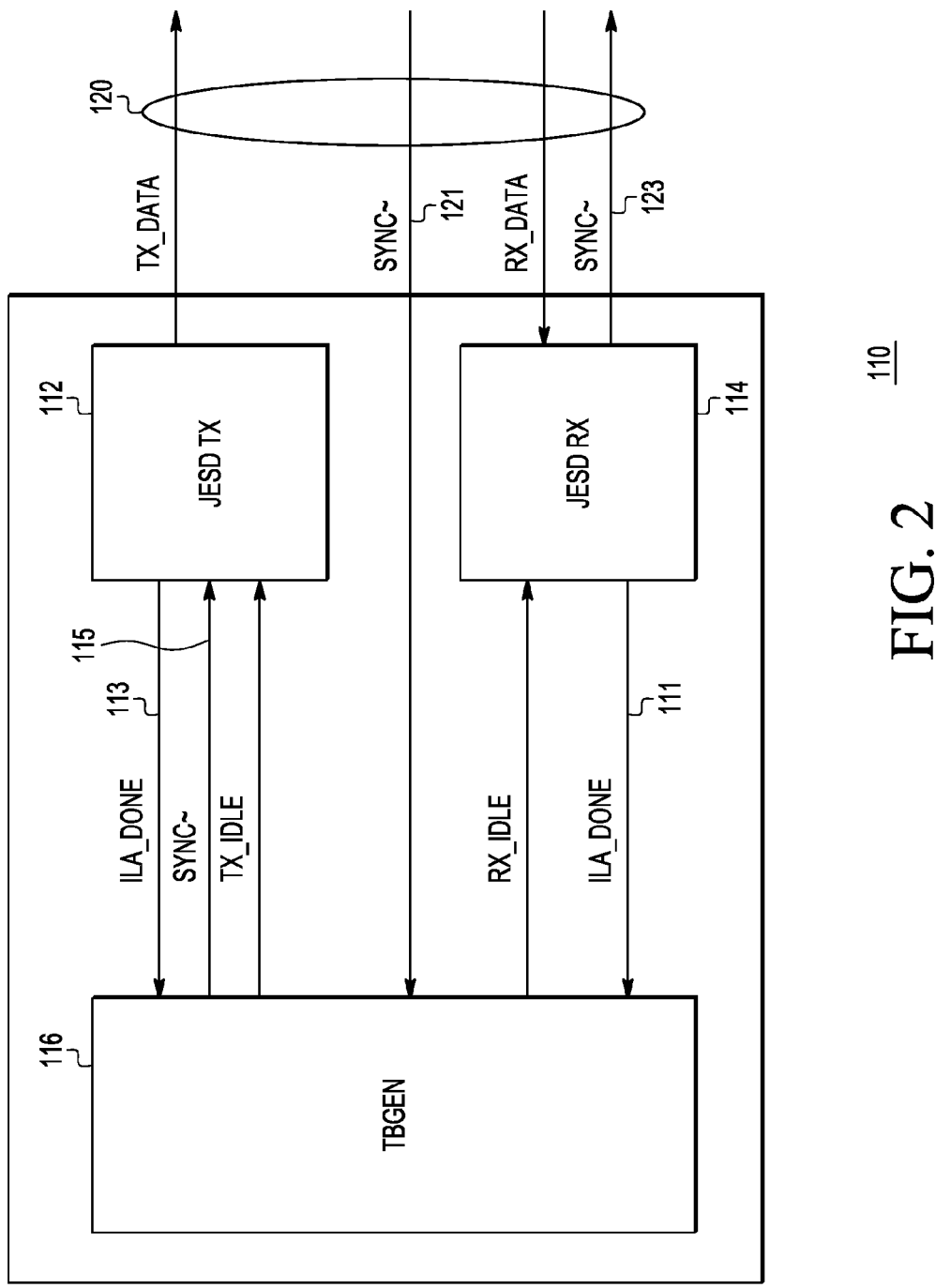
FIG. 2 is a high-level schematic block diagram of a portion of the BDFE processor of FIG. 1 associated with a single JESD link for one of the RFIC chips of FIG. 1.

FIG. 2 is a high-level block diagram of a portion of the BDFE processor 110 of FIG. 1 associated with a single JESD link 120 for one of the RFIC chips 130 of FIG. 1 (not shown in FIG. 2). In addition to the JESD TX 112 and the JESD RX 114 that are associated with the corresponding JESD link 120, the BDFE processor 110 also includes a time-based generator (TBGEN) 116 that is shared by all of the JESD TXs 112 and all of the JESD RXs 114 in the BDFE processor 110 for all of the JESD links 120 in the base station 100.

The TX_DATA signal is an outgoing data signal transmitted by the JESD TX 112 to the corresponding RFIC chip 130 (not shown in FIG. 2) via the JESD link 120. As described below, the TX_DATA signal can be real user data or a fixed data pattern that the RFIC chip 130 uses to synchronize the JESD link 120.

The incoming SYNC~ signal 121 received at the TBGEN 116 from the corresponding RFIC chip 130 via the JESD link 120 is a synchronization status signal that indicates whether the RFIC chip 130 has determined that the JESD link 120 is in sync (SYNC~ 121 high) or out of sync (SYNC~ 121 low).

The RX_DATA signal is an incoming data signal that the corresponding RFIC chip 130 transmits to the JESD RX 114 via the JESD link 120. Here, too, the RX_DATA signal can be real user data or a fixed data pattern that the BDFE processor 110 uses to synchronize the JESD link 120. The JESD RX 114 processes the RX_DATA signal and determines whether the JESD link 120 is in sync or out of sync. If the JESD RX 114 determines that the JESD link 120 is in sync, then the JESD RX 114 sets the ILA_DONE signal 111 high; otherwise, the JESD RX 114 sets the ILA_DONE signal 111 low indicating that the JESD RX 114 determined that the JESD link 120 is out of sync. In addition, the JESD RX 114 transmits the outgoing SYNC~ signal 123 signal to the RFIC chip 130 via the JESD link 120 to indicate whether the JESD RX 114 determined that the JESD link 120 is in sync (the SYNC~ signal 123 high) or out of sync (the SYNC~ signal 123 low). Note that, for the JESD RX 114, the ILA_DONE signal 111 can be assumed to be identical to the SYNC~ signal 123.

In accordance with the JESD204B.01 standard, when the JESD RX 114 initially synchronizes its processing using the RX_DATA signal, the JESD RX 114 de-asserts the SYNC~ signal 123 (i.e., drives the SYNC~ signal 123 from low to high) and asserts the ILA_DONE signal 111 high after receiving the ILA data. Similarly, after receiving the SYNC~ signal 115 and sending the ILA data, the JESD TX 112 asserts the ILA_DONE signal 113 high to indicate that the initial lane alignment is complete. Note that, for the JESD TX 112, the ILA_DONE signal 113 can be different from the SYNC~ signal 115 with the toggling of the SYNC~ signal 115 occurring prior to the toggling of the ILA_DONE signal 113.

The TBGEN 116 receives a different incoming SYNC~ signal 121 for each of the different JESD links 120 in the base station 100. As described further below with respect of FIGS. 5 and 6, for all of the JESD links 120 in the same logical group, the TBGEN 116 mutually aligns the SYNC~ signals 115 in time to a 10-msec pulse.

In addition, the TBGEN 116 receives (i) the ILA_DONE signal 113 from each of the different JESD TXs 112 in the BDFE processor 110 and (ii) the ILA_DONE signal 111 from each of the different JESD RXs 114 in the BDFE processor 110. For all of the JESD links 120 in the same logical group, the TBGEN 116 applies a logical NAND operation to all of the corresponding ILA_DONE signals 111 and all of the corresponding ILA_DONE signals 113 to generate a ~GROUP_ILA_DONE signal (not shown in FIG. 2). If at least one JESD link 120 in the logical group is not completely in sync, then the ~GROUP_ILA_DONE signal is high. A JESD link 120 is said to be completely in sync when the ILA_DONE signal 111 and the ILA_DONE signal 113 for that JESD link 120 are both high. If either or both ILA_DONE signals 111/113 are low, then that JESD link 120 is not completely in sync. If all of the JESD links 120 in the same logical group are completely in sync, then the ~GROUP_ILA_DONE signal is low.

As described further below with respect to FIG. 5, the TBGEN 116 generates time-aligned SYNC~ signals 115 for all of the JESD TXs 112 in the same logical group. If the time-aligned SYNC~ signals 115 are high, then each of the JESD links 120 in the logical group is completely in sync. The JESD TX 112 uses the SYNC~ signal 115 and the TX_IDLE signal to determine what data to transmit as the TX_DATA signal. If the SYNC~ signal 115 is low, then the JESD_TX 112 transmits a fixed data pattern, such as the K28.5 data pattern, as the TX_DATA signal. If the SYNC~ signal 115 is high and the TX_IDLE signal is high, then the JEDS TX 112 transmits zeros as the TX_DATA signal. If the SYNC~ signal 115 is high and the TX_IDLE signal is low, then the JESD TX 112 transmits user data as the TX_DATA signal.

As described further below with respect to FIG. 6, TBGEN 116 also generates time-aligned idle signals TX_IDLE (for all of the JESD TXs 112 in the logical group) and RX_IDLE (for all of the JESD RXs 114 in the logical group). If the TX_IDLE signal is low, then the JESD TX 112 transmits real user data as the TX_DATA signal to the corresponding RFIC chip 130 via the JESD link 120. If the TX_IDLE signal is high, then the JESD TX 112 transmits the fixed data pattern as the TX_DATA signal to the corresponding RFIC chip 130 via the JESD link 120. Similarly, if the RX_IDLE signal is low, then the JESD RX 114 processes the RX_DATA signal received from the corresponding RFIC chip 130 via the JESD link 120 as real user data. If the RX_IDLE signal is high, then the JESD RX 114 processes the RX_DATA signal received from the corresponding RFIC chip 130 via the JESD link 120 as the fixed data pattern in order to synchronize the JESD link 120.

In certain embodiments of the invention, a base station having a relatively large number of antennas can be configured to (i) support a single logical group of antennas or to (ii) simultaneously support two or more different logical groups of antennas, where each logical group needs its own set of time-aligned SYNC~ signals 115 and its own set of time-aligned TX_IDLE and RX_IDLE signals. In one particular embodiment, the BDFE processor 110 can be configured to generate up to N different sets of time-aligned SYNC~ signals 115 and support up to M different logical groups of antennas, where, in a particular configuration, the base station has a number of logical groups that is less than or equal to the number of different sets of time-aligned SYNC~ signals 115.

Figure 3:
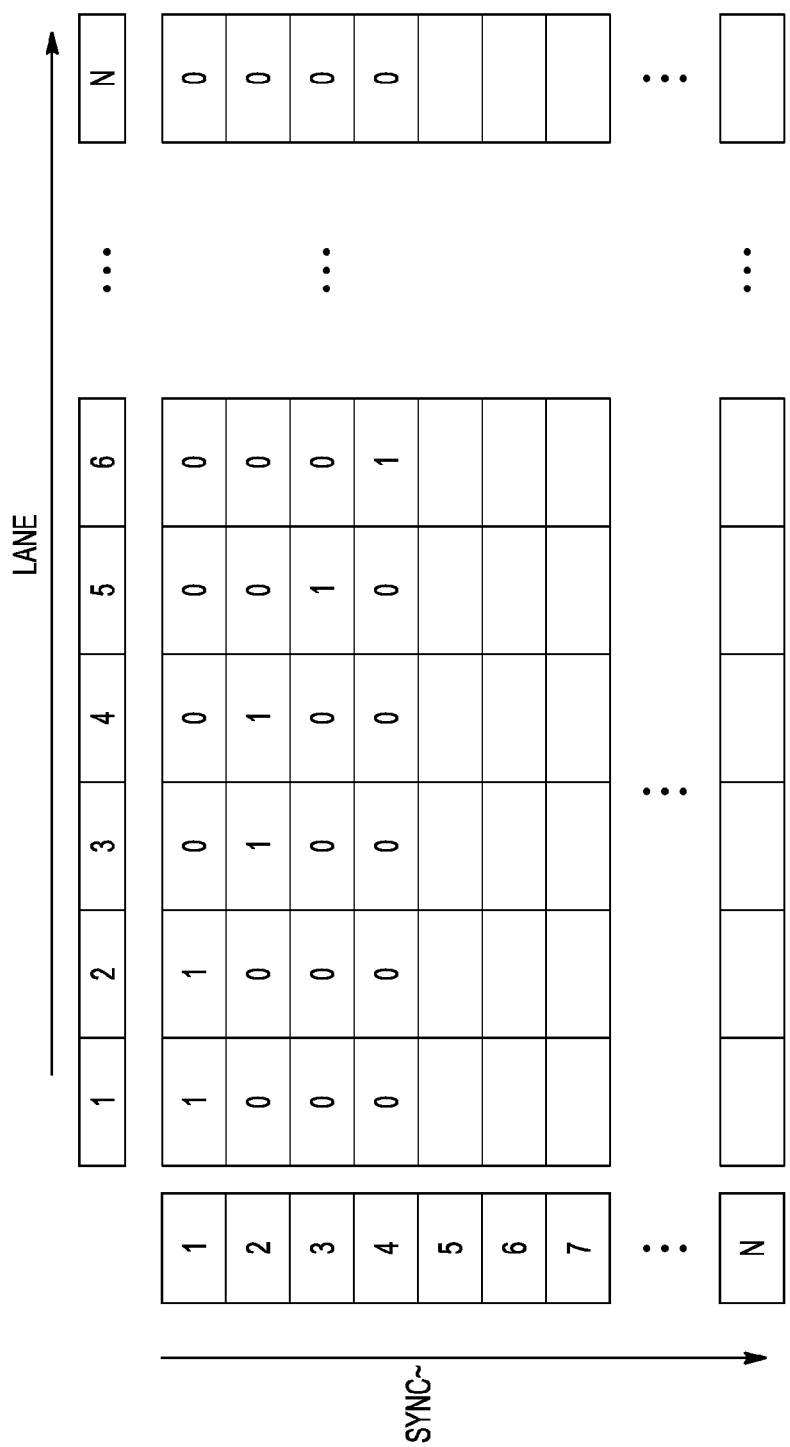
FIG. 3 is a tabular representation of an example sync-to-lane mapping for a base station.

FIG. 3 is a tabular representation of an example sync-to-lane mapping for a base station that supports up to N different sets of time-aligned signals SYNC~i. As shown in FIG. 3, the sync signal SYNC~1 corresponds to the lanes 1 and 2, the sync signal SYNC~2 corresponds to the lanes 3 and 4, the sync signal SYNC~3 corresponds to the lane 5, the sync signal SYNC~4 corresponds to the lane 6, and so on.

Figure 4:
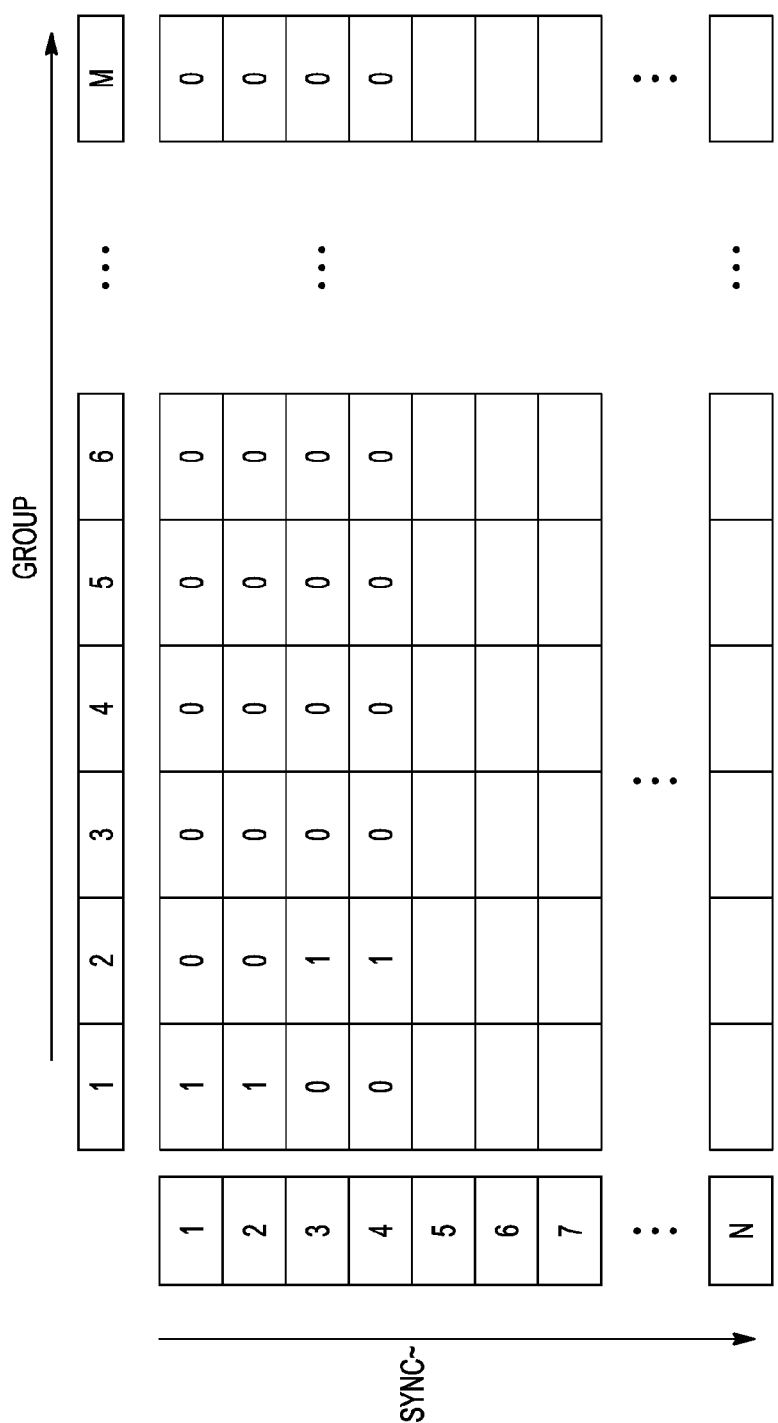
FIG. 4 is a tabular representation of an example sync-to-group mapping for the base station of FIG. 3.

FIG. 4 is a tabular representation of an example sync-to-group mapping for the base station of FIG. 3, which supports up to M different logical groups of antennas. As shown in FIG. 4, the sync signals SYNC~1 and SYNC~2 correspond to the logical group 1, the sync signals SYNC~3 and SYNC~4 correspond to the logical group 2, and so on. The mappings of FIGS. 3 and 4 imply that the lanes 1, 2, and 3 belong to the logical group 1, that the lanes 4 and 5 belong to the logical group 2, and so on.

Figure 5:
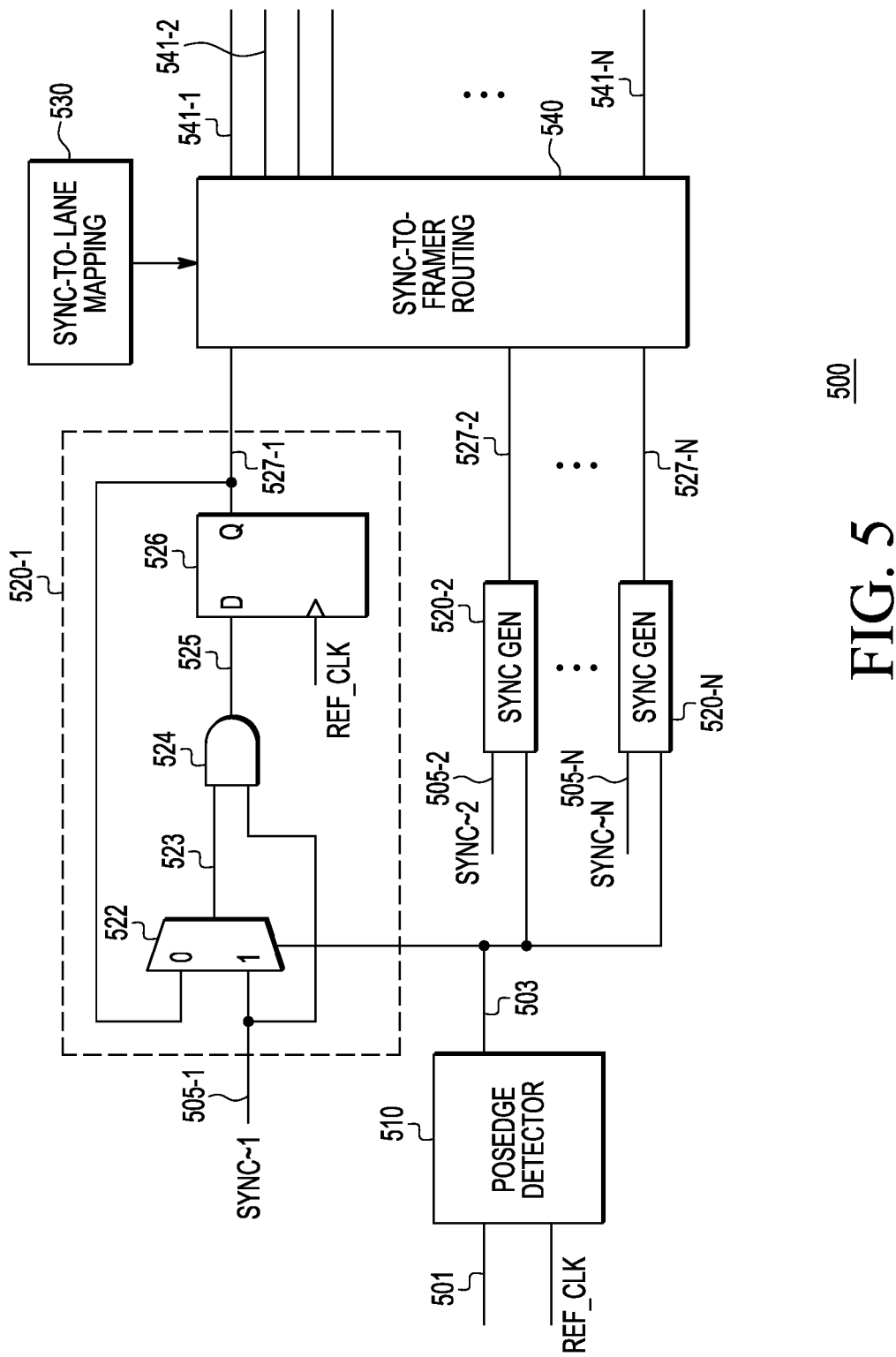
FIG. 5 is a schematic block diagram of sync-alignment circuitry within the TBGEN of FIG. 2.

FIG. 5 is a schematic block diagram of sync-alignment circuitry 500 within the TBGEN 116 of FIG. 2 that generates up to N different sets of the time-aligned SYNC~ signals 541-1 to 541-N, where the SYNC~ signal 115 of FIG. 2 is one of the SYNC-signals 541. The sync-alignment circuitry 500 includes N sync generation circuits 520 that generate N SYNC~ signals 527. In particular, the sync generation circuit 520-1 generates a first time-aligned SYNC~ signal 527-1, the sync generation circuit 520-2 generates a second time-aligned SYNC~ signal 527-2, and so on.

The sync-alignment circuitry 500 also includes, for all N sync generation circuits 520, a single positive-edge (posedge) detector 510, a single sync-to-lane mapping look-up table (LUT) 530, and a single sync-to-framer routing fabric 540. As represented in FIG. 5, each sync generation circuit 520 includes a (2×1) multiplexer (mux) 522, an AND gate 524, and a positive-edge-triggered flip-flop 526. Other implementations may include other combinations of suitable circuit elements.

The posedge detector 510 receives a pulse signal 501 that is generated within the BDFE processor 110 of FIG. 1. If the base station 100 of FIG. 1 conforms to the Long-Term Evolution (LTE) standard, the pulse signal 501 contains a pulse every 10 milliseconds that indicates the start of a block of outgoing data, where the width of each pulse is programmable and can be 16 nanoseconds wide. The output of the posedge detector 510 is a mux control signal 503 that is applied to the mux control port of each mux 522 of each sync generation circuit 520-i, each of which also receives its own SYNC~i signal 505-i. If the posedge detector 510 detects a rising edge of a pulse in the pulse signal 501, then the mux control signal 503 is asserted high for one clock cycle of reference clock signal REF_CLK. Otherwise, the mux control signal 503 remains low.

The following description applies to the first sync generation circuit 520-1, which receives the SYNC~1 signal 505-1, which is same as the SYNC~ signal 121 of FIG. 2 from an RFIC chip such as RFIC chip 130-1 of FIG. 1. Similar descriptions apply to the (N−1) other sync generation circuits 520-i in FIG. 5.

If the mux control signal 503 is low (i.e., logic 0), then the mux 522 forwards the sync signal 527-1 appearing at the mux "0" input node as the mux output signal 523 that is applied to the first input node of the AND gate 524. If the mux control signal 503 is high (i.e., logic 1), then the mux 522 forwards the SYNC~1 signal 505-1 appearing at the mux "1" input node as the mux output signal 523. The SYNC~1 signal 505-1 is also applied directly to the second input node of the AND gate 524.

The AND output signal 525 is applied to the D input node of the flip-flop 526, which is clocked by rising edges in the reference clock signal REF_CLK to forward the signal at its D input node to its D output node as the clock-aligned sync signal 527.

The sync-to-framer routing fabric 540 routes the different sync signals 527-i to the different JESD TXs 112 in the BDFE processor 110 based on the sync-to-lane mapping 530. The sync-to-lane LUT of FIG. 3 is an example of the sync-to-lane mapping 530 for a particular configuration of the base station 100. According to the example sync-to-lane LUT of FIG. 3, in FIG. 5, the sync generator 520-1 generates the sync signal 527-1 for the lanes 1 and 2, the sync generator 520-2 generates the sync signal 527-2 for the lane 3, and so on. Thus, for this example configuration, based on the sync-to-lane mapping 530, the sync-to-framer routing fabric 540 copies and routes the sync signal 527-1 into the sync signals 541-1 and 541-2, where the sync signal 541-1 is applied to the JESD TX 112 for the lane 1, and the sync signal 541-2 is applied to the JESD TX 112 for the lane 2, while the sync signal 527-2 is copied into the sync signal 541-3, which is applied to the JESD TX 112 for the lane 3, and so on.

Note that, in the example sync-to-group mapping of FIG. 4, the sync signals 527-1 and 527-2 both correspond to the logical group 1. In that case, not only will the sync signals 541-1 and 541-2 be mutually time aligned, but so will the sync signal 541-3. In this way, all of the sync signals associated with each logical group will be mutually time aligned. Note that the sync signals for different logical groups can be, but are not necessarily, mutually time aligned. Thus, the sync signal 527-3 will not necessarily be mutually time aligned with the sync signals 527-1 and 527-2, and therefore the sync signal 541-4 will not necessarily be mutually time aligned with the sync signals 541-1 to 541-3.

Figure 6:
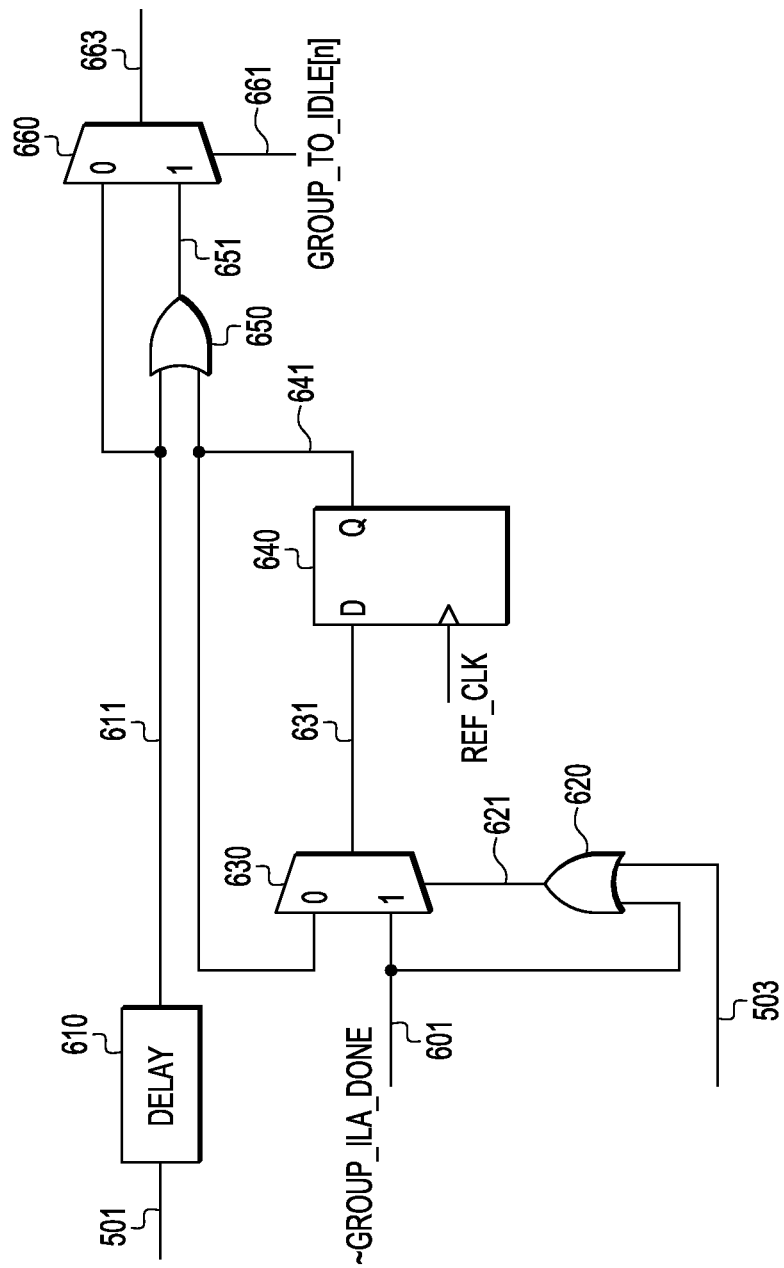
FIG. 6 is a schematic block diagram of an idle generation circuit within the TBGEN of FIG. 2.

FIG. 6 is a schematic block diagram of an idle generation circuit 600 within the TBGEN 116 of FIG. 2 that generates a time-aligned idle signal 663. The TBGEN 116 contains one instance of the idle generation circuit 600 for each lane in the BDFE processor 110, where the idle signal 663 of FIG. 6 is equivalent to both the TX_IDLE signal and the RX_IDLE signals of FIG. 2. The idle generation circuit 600 receives the reference clock signal REF_CLK, the pulse signal 501, and the mux control signal 503 of FIG. 5. The idle generation circuit 600 also receives the ~GROUP_ILA_DONE signal 601 described previously and a GROUP_TO_IDLE mux control signal 661 described further below. The idle generation circuit 600 includes a delay element 610, two OR gates 620 and 650, two (2×1) muxes 630 and 660, and a rising-edge-triggered flip-flop 640. Other implementations may include other combinations of suitable circuit elements.

The delay element 610 delays the pulse signal 501 to generate a delayed pulse signal 611 that is applied to a first input node of the OR gate 650 and to the "0" input node of the mux 660. The ~GROUP_ILA_DONE signal 601 is applied to the "1" input node of the mux 630 and to the first input node of the OR gate 620. The mux control signal 503 is applied to the second input of the OR gate 620 and the resulting mux control signal 621 is applied to the control node of the mux 630. The Q output signal 641 from the flip-flop 640 is applied to the "0" input node of the mux 630 (and also to the second input node of the OR gate 650) and the resulting mux output signal 631 is applied to the D input node of the flip-flop 640, which is toggled at rising edges of the reference clock signal REF_CLK. The resulting OR output signal 651 from the OR gate 650 is applied to the "1" input node of the mux 660. The mux 660 presents one of its two inputs based on the GROUP_TO_IDLE mux control signal 661 as the idle signal 663.

Figure 7:
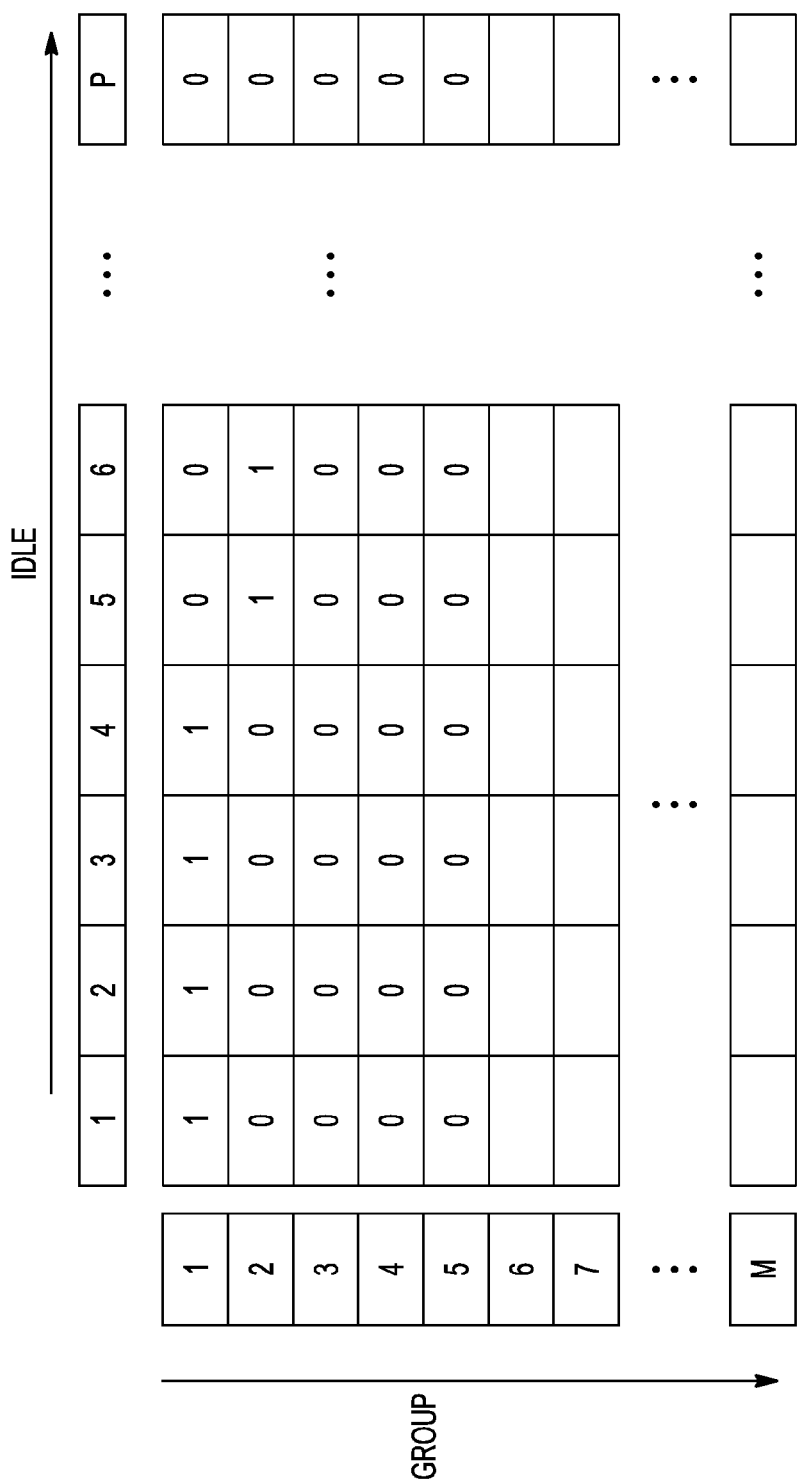
FIG. 7 is a tabular representation of an example group-to-idle mapping for the base station of FIGS. 3 and 4.

FIG. 7 is a tabular representation of an example group-to-idle mapping for the base station of FIGS. 3 and 4, which supports up to P different idle signals. As shown in FIG. 7, the idle signals IDLE1, IDLE2, IDLE3, and IDLE4 correspond to the logical group 1, the idle signals IDLE5 and IDLE6 corresponds to the logical group 2, and so on. There is a one-to-one relationship between the data in the group-to-idle mapping of FIG. 7 and the mux control signal 661 of FIG. 6. As mentioned previously, each instance of the idle generation circuit 600 of FIG. 6 is associated with a specific lane. The mux control signal 661 is GROUP_TO_IDLE[n], where GROUP_TO_IDLE is the mapping of FIG. 7, "n" identifies the group to which the associated lane belongs (i.e., the row of FIG. 7), and the column of FIG. 7 corresponds to the associated lane.

Note that, in the example group-to-idle mapping of FIG. 7, the idle signals IDLE1, IDLE2, IDLE3, and IDLE4 correspond to the logical group 1. In that case, the idle signals TX_IDLE and RX_IDLE for all of the lanes 1-4 will be mutually time-aligned. In this way, all of the idle signals associated with each logical group will be mutually time aligned. Note that the idle signals for different logical groups can be, but are not necessarily, mutually time aligned. Thus, the idle signals TX_IDLE and RX_IDLE for the lanes 5 and 6 will be mutually time aligned with each other, but will not necessarily be mutually time aligned with the idle signals for the lanes 1-4.

Figure 8A:
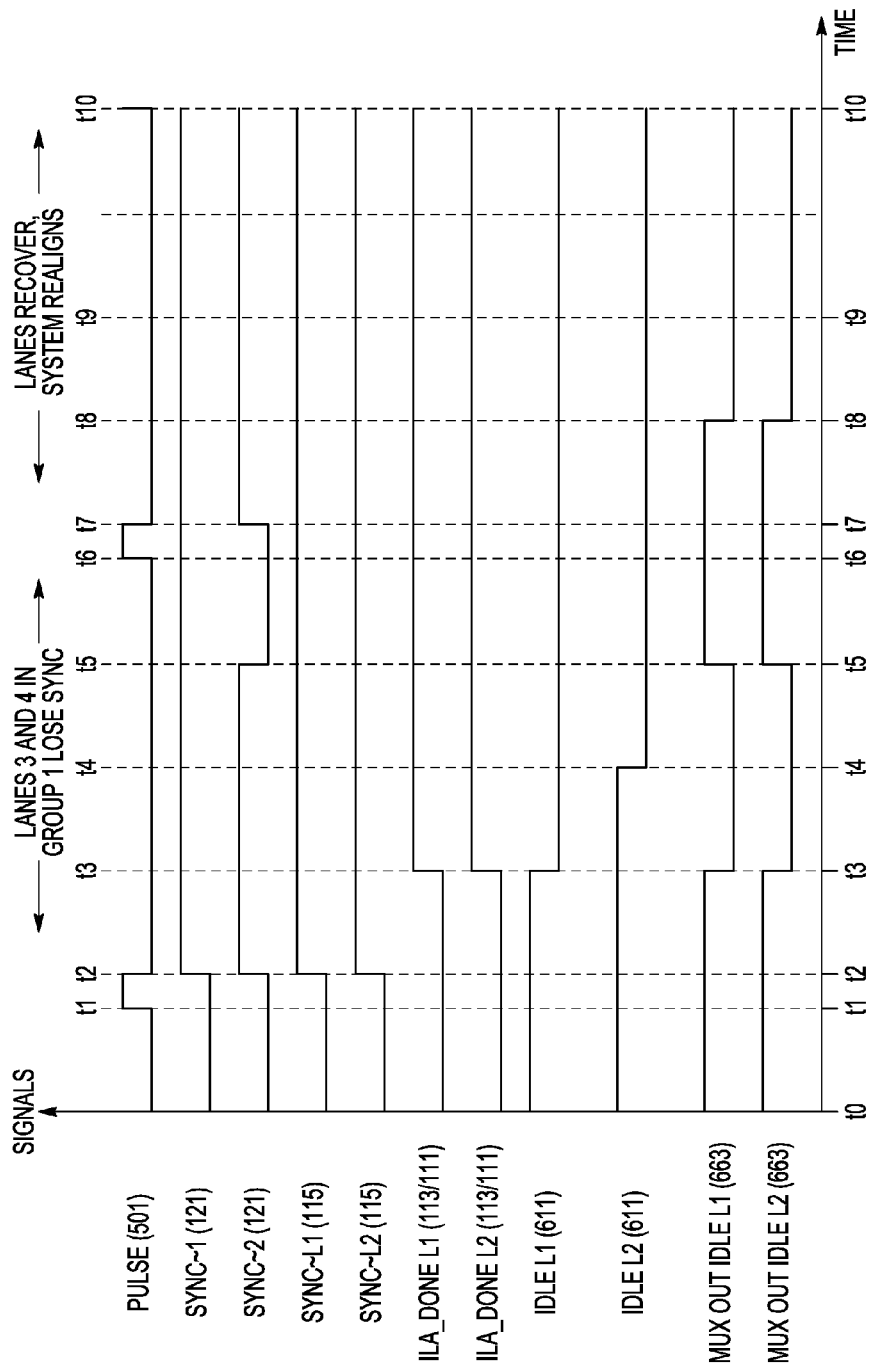
FIGS. 8A and 8B are a timing diagram showing waveforms corresponding to some of the different signals in the BDFE processor of FIGS. 1, 2, 5, and 6 for an example scenario corresponding to the four lanes 1-4 of logical group 1 in FIGS. 3, 4, and 7.
Figure 8B:
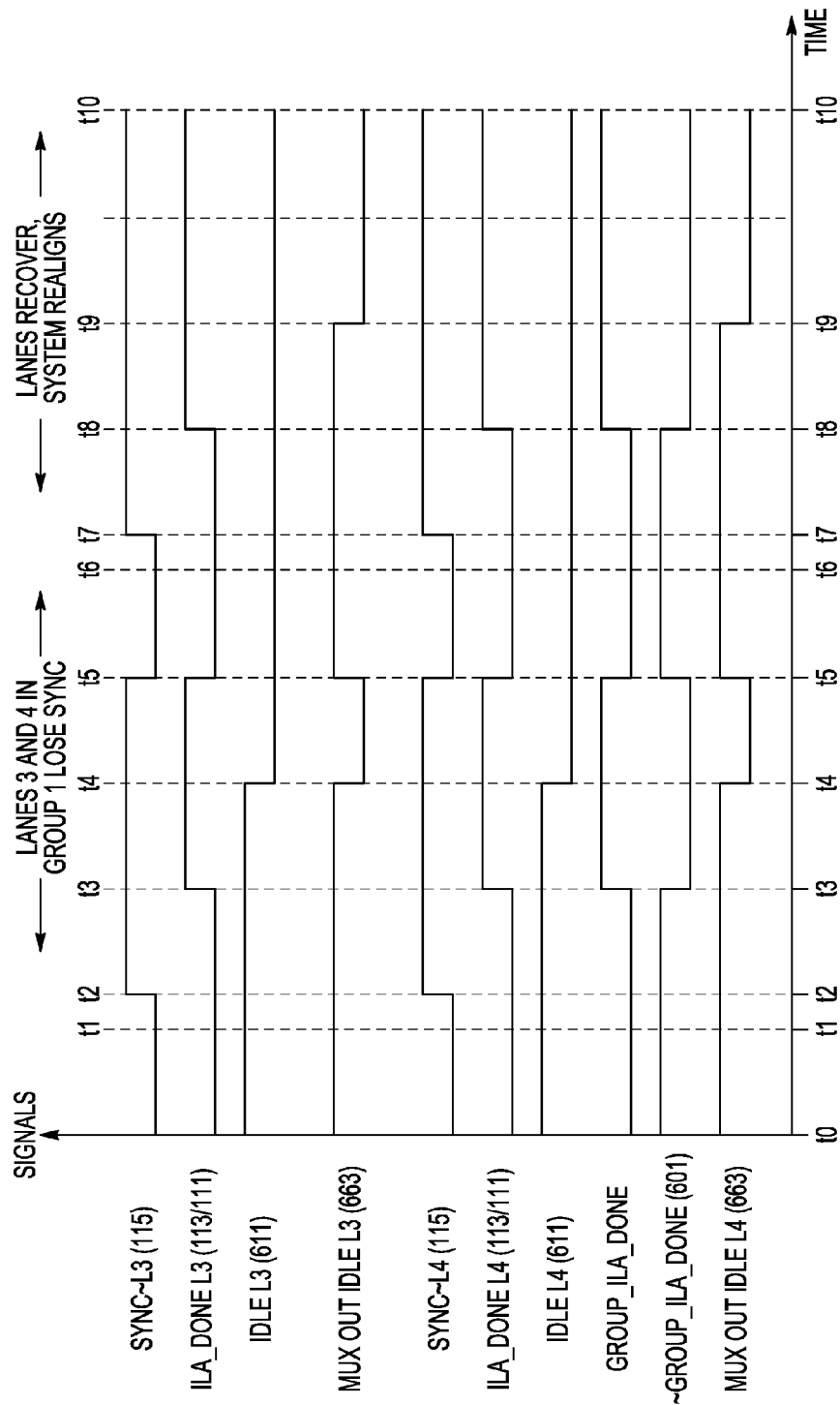

FIGS. 8A and 8B are a timing diagram showing waveforms corresponding to the following different signals in the BDFE processor 110 for an example scenario corresponding to the four lanes 1-4 of logical group 1 in FIGS. 3, 4, and 7:
Pulse is the 10 msec pulse signal 501 of FIGS. 5 and 6;
SYNC~1 is the SYNC~ signal 121 of FIG. 2 for RFIC chip 130-1 of FIG. 1;
SYNC~2 is the SYNC~ signal 121 of FIG. 2 for RFIC chip 130-2 of FIG. 1;
SYNC~L1 is the SYNC~ signal 115 of FIG. 2 for lane 1;
SYNC~L2 is the SYNC~ signal 115 of FIG. 2 for lane 2;
ILA_DONE L1 is the ILA_DONE signals 111 and 113 of FIG. 2 for lane 1;
ILA_DONE L2 is the ILA_DONE signals 111 and 113 of FIG. 2 for lane 2;
IDLE L1 is the IDLE signal 611 of FIG. 6 for lane 1;
IDLE L2 is the IDLE signal 611 of FIG. 6 for lane 2;
Mux out IDLE L1 is the time-aligned IDLE signal 663 of FIG. 6 for lane 1;
Mux out IDLE L2 is the time-aligned IDLE signal 663 of FIG. 6 for lane 2;
SYNC~L3 is the SYNC~ signal 115 of FIG. 2 for lane 3;
ILA_DONE L3 is the ILA_DONE signals 111 and 113 of FIG. 2 for lane 3;
IDLE L3 is the IDLE signal 611 of FIG. 6 for lane 3;
Mux out IDLE L3 is the time-aligned IDLE signal 663 of FIG. 6 for lane 3;
SYNC~L4 is the SYNC~ signal 115 of FIG. 2 for lane 4;
ILA_DONE L4 is the ILA_DONE signals 111 and 113 of FIG. 2 for lane 4;
IDLE L4 is the IDLE signal 611 of FIG. 6 for lane 4;

~GROUP_ILA_DONE is the ~GROUP_ILA_DONE signal 601 of FIG. 6 for all four lanes 1-4 in group 1; and
Mux out IDLE L4 is the time-aligned IDLE signal 663 of FIG. 6 for lane 4.

According to the scenario in FIG. 8, at the beginning of the scenario at time t0, none of the lanes 1-4 are individually synchronized or mutually aligned in time. When the next pulse in the Pulse signal 501 occurs at time t1, the process of synchronizing the individual lanes and then mutually aligning the synchronized lanes in time begins, such that, by time t2, all four lanes 1-4 are individually synchronized; by time t3, all four lanes 1-4 are mutually aligned in time; and, by time t4, all four lanes 1-4 are transmitting user data.

At time t5, for some unspecified reason, lanes 3 and 4 lose sync. When the next pulse in the Pulse signal 501 occurs at time t6, the process of individually re-synchronizing lanes 3 and 4 and mutually re-aligning all four lanes in time begins, such that, by time t7, lanes 3 and 4 are individually re-synchronized; by time t8, all four lanes 1-4 are mutually re-aligned in time; and, by time t9, all four lanes 1-4 are once again transmitting user data. Note that during this re-synchronization and time re-alignment process, lanes 1 and 2 never lose their individual synchronization.

Embodiments of the invention may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, micro-controller, general-purpose computer, or other processor. However, it also will be apparent to those of skill in the art that the present invention employs a hardware solution/integrated circuits to implement certain functions over any software based solution.

For purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Signals and corresponding terminals, nodes, ports, or paths may be referred to by the same name and are interchangeable for purposes here.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

The invention claimed is:

1. An article of manufacture comprising a baseband digital front-end (BDFE) processor for a multiple-in, multiple-out (MIMO) system having one or more radio-frequency integrated circuit (RFIC) chips connected to the BDFE processor by way of multiple JESD204B lanes, the BDFE processor comprising:
   one or more sync-alignment circuits comprising one or more sets of integrated circuits that generate multiple, time-aligned JESD204B SYNC~ signals for a group of the JESD204B lanes based on a sync-to-lane mapping and a lane-to-group mapping; and
   multiple idle generation circuits comprising multiple sets of the integrated circuits that generate multiple, time-aligned JESD204B IDLE signals for the group of the JESD204B lanes based on a group-to-idle mapping.

2. The article of claim 1, wherein the article is the MIMO system.

3. The article of claim 1, wherein:
   the MIMO system comprises a plurality of RFIC chips, each RFIC chip corresponding to a plurality of the JESD204B lanes;
   the BDFE processor comprises a plurality of the sync-alignment circuits and a different idle generation circuit for each different JESD204B lane;
   the plurality of lanes are programmably assignable to one or more logical groups, each logical group comprising one or more of the lanes; and
   each sync-alignment circuit is programmably assignable to a logical sub-group of one or more of the lanes assigned to one of the logical groups.

4. The article of claim 1, wherein, if two or more sync-alignment circuits are assigned to two or more sub-groupings of the same logical group, then the two or more sync-alignment circuits align their JESD204B SYNC~ signals in time based on the same data pulse signal.

5. The article of claim 1, wherein the BDFE processor further comprises an edge detector that receives a data pulse signal and generates an edge signal indicating detection of a pulse in the data pulse signal, and wherein each sync-alignment circuit comprises:
   a (2×1) multiplexer (MUX) that receives first and second MUX input signals and a MUX control signal and presents one of the first and second MUX input signals as a MUX output signal based on the MUX control signal;
   an AND gate that receives first and second AND input signals and generates an AND output signal; and
   a flip-flop that receives a D input signal and a clock signal and presents the D input signal as a Q output signal based on the clock signal, wherein:
      the MUX receives the Q output signal as the first MUX input signal, the first sync signal as the second MUX input signal, and the edge signal as the MUX control signal;
      the AND gate receives the MUX output signal and the first sync signal as the first and second AND input signals;
      the flip-flop receives the AND output signal as the D input signal; and
      the Q output signal is the first aligned sync signal.

6. The article of claim 1, wherein the BDFE processor further comprises an edge detector that receives a data pulse signal and generates an edge signal indicating detection of a pulse in the data pulse signal, and wherein each idle-alignment circuit comprises:
   a first (2×1) MUX that receives first and second first-MUX input signals and a first-MUX control signal and presents one of the first and second first-MUX input signals as a first-MUX output signal based on the first-MUX control signal;
   a second (2×1) MUX that receives first and second second-MUX input signals and a second-MUX control signal and presents one of the first and second second-MUX input signals as a second-MUX output signal based on the second-MUX control signal;
   a first OR gate that receives first and second first-OR input signals and generates a first-OR output signal;
   a second OR gate that receives first and second second-OR input signals and generates a second-OR output signal; and
   a flip-flop that receives a D input signal and a clock signal (REF_CLK) and presents the D input signal as a Q output signal based on the clock signal, wherein:
      the first OR gate receives a group initial lane alignment (ILA) signal as the first first-OR input signal and the edge signal as the second first-OR input signal;
      the first MUX receives the Q output signal as the first MUX input signal, the group ILA signal as the second MUX input signal, and the first-OR output signal as the first-MUX control signal;
      the flip-flop receives the first-MUX output signal as the D input signal;
      the second OR gate receives a delayed version of the data pulse signal as the first second-OR input signal and the Q output signal as the second second-OR input signal;
      the second MUX receives the delayed version of the data pulse signal as the first second-MUX input signal, the second-OR output signal as the second second-MUX input signal, and a group-to-idle lookup table (LUT) entry as the second-MUX control signal; and the second-MUX output signal is the first aligned idle signal.

\* \* \* \* \*